(12) United States Patent
Yang et al.

(10) Patent No.: US 11,892,953 B2
(45) Date of Patent: Feb. 6, 2024

(54) INTERPROCESS COMMUNICATION METHOD AND INTERPROCESS COMMUNICATIONS SYSTEM

(71) Applicant: Huawei Technologies Co., Ltd., Shenzhen (CN)

(72) Inventors: Qibin Yang, Hangzhou (CN); Senyu Liu, Shenzhen (CN); Xiaohui Bie, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 209 days.

(21) Appl. No.: 16/846,764

(22) Filed: Apr. 13, 2020

(65) Prior Publication Data

US 2020/0242043 A1 Jul. 30, 2020

Related U.S. Application Data

(63) Continuation of application No. PCT/CN2018/113510, filed on Nov. 1, 2018.

(30) Foreign Application Priority Data

Oct. 13, 2017 (CN) .......................... 201710954668.3

(51) Int. Cl.
*G06F 12/10* (2016.01)
*G06F 9/54* (2006.01)

(52) U.S. Cl.
CPC .............. *G06F 12/10* (2013.01); *G06F 9/544* (2013.01); *G06F 2212/657* (2013.01)

(58) Field of Classification Search
CPC .... G06F 16/84; G06F 9/544; G06F 2212/657; G06F 12/1072; G06F 12/109;
(Continued)

(56) References Cited

U.S. PATENT DOCUMENTS 6,631,447 B1 * 10/2003 Morioka ............. G06F 12/0826
711/124
7,640,549 B2 12/2009 Shen et al.
(Continued)

FOREIGN PATENT DOCUMENTS

CN 101739301 A 6/2010
CN 103176854 A 6/2013
(Continued)

*Primary Examiner* — Yaima Rigol
*Assistant Examiner* — Edward Waddy, Jr.
(74) *Attorney, Agent, or Firm* — Conley Rose, P.C.

(57) ABSTRACT

An interprocess communication (IPC) method and an IPC system for transmit communication data from a first process to a second process, where the method includes performing initialization configuration on the first process and the second process, including creating first memory space in shared memory space, selecting a communication manner based on a length of the communication data and a value of a threshold, where the threshold is a size of the first memory space, performing interprocess data exchange in the selected communication manner, selecting a memory sharing manner for communication when the length of the communication data is less than the threshold, and selecting a data file manner for communication when the length of the communication data reaches or exceeds the threshold.

20 Claims, 5 Drawing Sheets

(58) Field of Classification Search
CPC ......... G06F 15/17306; G06F 2212/152; G06F 12/10; G06F 15/163
USPC .......................................... 711/147, 170, 203
See application file for complete search history.

(56) References Cited

U.S. PATENT DOCUMENTS

| | | | |
|---|---|---|---|
| 9,645,761 B1* | 5/2017 | Ben Dayan | H04L 43/0882 |
| 10,585,689 B1* | 3/2020 | Marion | G06F 9/45558 |
| 2009/0204784 A1* | 8/2009 | Favergeon-Borgialli | G06F 12/08 711/E12.001 |
| 2013/0191846 A1* | 7/2013 | Kumura | G06F 9/544 718/106 |
| 2013/0226888 A1 | 8/2013 | Govind et al. | |
| 2015/0186192 A1 | 7/2015 | Dyakin et al. | |
| 2016/0154735 A1* | 6/2016 | Hwang | G06F 12/0895 711/130 |
| 2017/0262382 A1* | 9/2017 | Okada | G06F 12/0897 |
| 2017/0353404 A1* | 12/2017 | Hodge | H04L 51/02 |
| 2018/0349335 A1* | 12/2018 | Hodge | H04L 67/535 |
| 2019/0377691 A1* | 12/2019 | Kim | G06F 3/0604 |

FOREIGN PATENT DOCUMENTS

| | | |
|---|---|---|
| CN | 104102550 A | 10/2014 |
| CN | 104657224 A | 5/2015 |
| CN | 104679598 A | 6/2015 |
| CN | 104796337 A | 7/2015 |
| CN | 104881330 A | 9/2015 |
| CN | 105183400 A | 12/2015 |
| CN | 105975407 A | 9/2016 |
| CN | 106095817 A | 11/2016 |
| CN | 106980551 A | 7/2017 |
| WO | 2017142525 A1 | 8/2017 |

* cited by examiner

INTERPROCESS COMMUNICATION METHOD AND INTERPROCESS COMMUNICATIONS SYSTEM

CROSS-REFERENCE TO RELATED APPLICATIONS

This application is a continuation of International Patent Application No. PCT/CN2018/113510 filed on Nov. 1, 2018, which claims priority to Chinese Patent Application No. 201710954668.3 filed on Oct. 13, 2017. The disclosures of the aforementioned applications are hereby incorporated by reference in their entireties.

TECHNICAL FIELD

The present disclosure relates to the computer field, and in particular, to an interprocess communication (IPC) method and an IPC system.

BACKGROUND

IPC is a communication transmission technology that is mainly used to transmit a message between different processes in a computer system. Currently, main mechanisms include pipeline communication, socket, and shared memory.

A message communication mechanism in an existing terminal operating system such as an ANDROID system includes a binder communication mechanism, and the binder communication mechanism is an IPC communication mechanism. In principle, the binder communication mechanism is also a communication mechanism based on a client/server (C/S) architecture, except that an internal proxy is used for communication in binder communication such that a binder client seems to perform an operation locally during communication. In addition, during communication, a binder only needs to know a name of a peer service without a need to know a port of the service.

The binder communication mechanism in ANDROID is indeed very secure and fast, but also has the following disadvantages: (1) Communication performance of the binder is related to a length of data carried in the binder. In addition, a binder driver needs to copy, to second process space, data carried by a first process of the binder. This is also time-consuming, and a time required increases as a data volume increases. (2) Because a kernel driver needs to copy the data of the first process, specific memory needs to be managed, for storing the data. Due to a limited communication information length, the kernel driver needs to allocate additional memory to assist in communication.

SUMMARY

The present disclosure provides an IPC method and an IPC system, to resolve a delay issue caused by memory copy, allocation, and release and bypass a restriction imposed by a binder communication mechanism on a volume of carried data.

According to a first aspect, an IPC method is provided, and is used to transmit communication data from a first process to a second process. The method includes determining whether a data length of the communication data of the first process is less than a size of first memory space, where the communication data is used for data exchange between the first process and the second process, and the first memory space is memory space allocated to the first process for access, when the length of the communication data is less than the size of the first memory space, storing the communication data in the first memory space, allocating virtual memory space to the second process, where the virtual memory space is used by the second process to access the communication data, and mapping a physical memory page in the first memory space to the virtual memory space. This resolves a delay issue caused by memory copy, allocation, and release and bypasses a restriction imposed by a binder communication mechanism in on a volume of carried data.

In a possible implementation, the method includes unmapping, or demapping the physical memory page in the first memory space from the virtual address space, to release the virtual address space. In this implementation, a virtual address can be reclaimed.

In a possible implementation, the method includes, when the length of the communication data is greater than the size of the first memory space, storing the communication data as a data file, where the second process accesses the communication data using metadata of the data file.

In a possible implementation, the storing the communication data as a data file, where the second process accesses the communication data using metadata of the data file includes storing the communication data in second memory space outside the first memory space, mapping the second memory space to the data file, and storing the metadata of the data file in the first memory space.

In a possible implementation, the method includes adjusting an address of the communication data, and sending a message to the second process, where the message includes the metadata of the data file.

In a possible implementation, the metadata of the data file includes a file descriptor, and before sending a message to the second process, the method further includes determining the corresponding second process based on control information corresponding to the file descriptor, and converting the file descriptor into a file descriptor that can be identified by the second process.

In a possible implementation, after interprocess data exchange is performed in a selected communication manner, the method further includes determining a communication status of the data file based on a communication status identifier of the data file, and in response to a fact that communication has been completed for the data file, storing file information of the data file in a first cache list, where the file information is used as to-be-used file information for a next time. In this implementation, a file used at the end of reading by the second process is reserved and is used as a backup for a next process.

In a possible implementation, the storing the communication data as a data file, where the second process accesses the communication data using metadata of the data file includes storing the communication data in second memory space outside the first memory space, sending the metadata of the data file to a kernel, allocating virtual memory space to the second process, where the virtual memory space is used by the second process to access the communication data, and mapping physical memory address space of the data file to the virtual memory space based on the metadata.

According to another aspect, an IPC method is provided, and the method includes storing communication data of a first process in first memory space, where the communication data is used for data exchange between the first process and a second process, and the first memory space is memory space allocated to the first process for access, allocating virtual memory space to the second process, where the virtual memory space is used by the second process to access the communication data, and mapping a physical memory page in the first memory space to the virtual memory space.

In a possible implementation, before storing communication data of a first process in first memory space, the method further includes determining that a data length of the communication data is less than a size of the first memory space.

According to another aspect, an embodiment of the present disclosure provides an IPC system configured to transmit communication data from a first process to a second process. The system includes a selection module configured to determine whether a data length of the communication data of the first process is less than a size of first memory space, where the communication data is used for data exchange between the first process and the second process, and the first memory space is memory space allocated to the first process for access, a processing module configured to, when the length of the communication data is less than the size of the first memory space, store the communication data in the first memory space, and a configuration module configured to allocate virtual memory space to the second process, where the virtual memory space is used by the second process to access the communication data, where the processing module is further configured to map a physical memory page in the first memory space to the virtual memory space.

According to another aspect, an IPC method is provided, and is used to transmit communication data from a first process to a second process. The method includes performing initialization configuration on the first process and the second process, including creating first memory space in shared memory space, selecting a communication manner based on a length of the communication data and a value of a threshold, where the communication data includes data and a message, and the threshold is a size of the first memory space, and performing interprocess data exchange in the selected communication manner. This resolves a delay issue caused by memory copy, allocation, and release and bypasses a restriction imposed by a binder communication mechanism in ANDROID on a volume of carried data.

In a possible implementation, the method includes selecting, in response to a fact that the length of the communication data is less than the threshold, a memory sharing manner for communication, where in the memory sharing manner, the communication data is transmitted using the first memory space.

In a possible implementation, the performing interprocess data exchange in the selected communication manner includes allocating virtual address space to the second process, and mapping a physical memory page in the first memory space to the virtual address space of the second process. In this implementation, a read/write function is enabled using shared memory of the first process such that memory is fully shared between the first process and the second process, thereby resolving a delay issue caused by memory copy, allocation, and release.

In a possible implementation, the performing interprocess data exchange in the selected communication manner further includes sending the message to the second process, to trigger the second process to run.

In a possible implementation, after performing interprocess data exchange in the selected communication manner, the method further includes unmapping the physical memory page in the first memory space from the virtual address space, to release the virtual address space. In a possible implementation, the selecting a communication manner based on a length of the communication data and a value of a threshold includes selecting, in response to a fact that the length of the communication data is greater than or equal to the threshold, a data file manner for communication, where in the data file manner, the communication data is stored as a data file, and metadata of the data file is transmitted using the first memory space. In this implementation, a restriction imposed by a communication mechanism on a volume of carried data is bypassed.

In a possible implementation, the selecting, in response to a fact that the length of the communication data is greater than or equal to the threshold, a data file manner for communication includes storing the communication data in second memory space outside the shared memory space, mapping the second memory space to the data file, and storing the metadata of the data file in the first memory space. In this implementation, a restriction imposed by a communication mechanism on a volume of carried data is bypassed.

In a possible implementation, before the storing the communication data in second memory space outside the shared memory space, the method further includes determining a to-be-used data file based on a first cache list that is used to store to-be-used file information, determining, based on the to-be-used data file, to-be-used shared memory corresponding to the to-be-used data file, determining whether the to-be-used shared memory includes to-be-used shared memory that meets the length of the communication data, and in response to a fact that the to-be-used shared memory includes to-be-used shared memory that meets the length of the communication data, using, as the second memory space, the to-be-used shared memory that meets the length of the communication data, or in response to a fact that the to-be-used shared memory does not include to-be-used shared memory that meets the length of the communication data, creating, outside the shared memory space, shared memory that is used as the second memory space and that meets the length of the communication data. In this implementation, the second memory space is created outside the shared memory space, and therefore, is not restricted by a size of the original shared memory space, thereby bypassing a restriction imposed by a communication mechanism on a volume of carried data.

In a possible implementation, the data file includes a communication status identifier, the communication status identifier is used to indicate a communication status of the data file, and before the determining a to-be-used data file based on a first cache list that is used to store to-be-used file information, the method further includes traversing a second cache list, where the second cache list is used to store file information of a data file in communication, determining, based on the communication status identifier, whether the second cache list includes file information corresponding to a data file for which communication has been completed, and in response to a fact that the second cache list includes the file information corresponding to the data file for which communication has been completed, storing, in the first cache list, the file information that is in the second cache list and that is corresponding to the data file for which communication has been completed, where the file information is used as the to-be-used file information. In this implementation, it can be ensured that the data file, for which communication has been completed, corresponding to the file information that is in the second cache list and that has not been stored in the first cache list in time is also included in a selection range of a second cache list, thereby improving cache resource utilization.

In a possible implementation, file information in the first cache list is sorted based on a size of corresponding to-be-used shared memory, and the determining whether the to-be-used shared memory includes to-be-used shared memory that meets the length of the communication data includes successively performing determining starting from smallest to-be-used shared memory in the first cache list. In this implementation, smallest shared memory in shared memory that meets the length of the communication data and that is corresponding to a file descriptor in the first cache list is used with priority, to save space.

In a possible implementation, the storing the metadata of the data file in the first memory space includes determining whether the first memory space is sufficient to store the metadata of the data file, and in response to a fact that the first memory space is insufficient to store the metadata of the data file, expanding the first memory space to be sufficient to store the metadata of the data file, or in response to a fact that the first memory space is sufficient to store the metadata of the data file, replacing original data in the first memory space with the metadata of the data file. In this implementation, the metadata of the data file is stored using the existing first memory space, thereby saving space.

In a possible implementation, performing interprocess data exchange in the selected communication manner includes exchanging data by transmitting the metadata of the data file. In this implementation, data is shared by transmitting the metadata.

In a possible implementation, exchanging data by transmitting the metadata of the data file includes adjusting an address of the communication data, and sending a message to the second process, where the message is used to trigger the second process, and the message includes the metadata of the data file.

In a possible implementation, the metadata of the data file includes a file descriptor, and before the sending a message to the second process, the method further includes determining the corresponding second process based on control information corresponding to the file descriptor, and converting the file descriptor into a file descriptor that can be identified by the second process.

In a possible implementation, triggering the second process includes triggering the second process to restore data in the data file based on the file descriptor that can be identified by the second process and the corresponding control information.

In a possible implementation, after performing interprocess data exchange in the selected communication manner, the method further includes determining a communication status of the data file based on a communication status identifier of the data file, and in response to a fact that communication has been completed for the data file, storing file information of the data file in a first cache list, where the file information is used as to-be-used file information for a next time. In this implementation, a file used at the end of reading by the second process is reserved and is used as a backup for a next process.

In a possible implementation, storing file information of the data file in the first cache list, where the file information is used as to-be-used file information for a next time further includes determining whether a volume of to-be-used file information stored in the first cache list is greater than a threshold of the first cache list, where the threshold of the first cache list is a maximum value of a volume of to-be-used file information that can be accommodated in the first cache list, and in response to a fact that the volume of to-be-used file information stored in the first cache list is greater than the threshold of the first cache list, determining, based on the to-be-used file information in the first cache list, a to-be-used data file corresponding to the to-be-used file information, determining, based on the to-be-used data file, to-be-used shared memory corresponding to the to-be-used data file, releasing smallest to-be-used shared memory in the to-be-used shared memory, and deleting, from the first cache list, to-be-used file information corresponding to the smallest to-be-used shared memory. In this implementation, an upper limit of a stored volume of to-be-used file information is set in the first cache list. When the stored volume reaches the upper limit, the smallest memory is released. This ensures that memory is not occupied because there is excessive shared cache memory, and can also improve cache utilization.

According to another aspect, an embodiment of the present disclosure provides an IPC system configured to transmit communication data from a first process to a second process, and the system includes a configuration module, a selection module, and a processing module. The configuration module is configured to perform initialization configuration on the first process and the second process, where the initialization configuration includes creating first memory space in shared memory space. The selection module is configured to select a communication manner based on a length of the communication data and a value of a threshold, where the communication data includes data and a message, and the threshold is a size of the first memory space. The processing module is configured to perform interprocess data exchange in the selected communication manner. The system can implement a function performed in the method design in the first aspect. The function may be implemented by hardware, or may be implemented by hardware executing corresponding software. The hardware or the software includes one or more modules corresponding to the foregoing function.

According to another aspect, an embodiment of the present disclosure provides a computer readable storage medium, and the computer readable storage medium stores an instruction. When running on a computer, the instruction enables the computer to perform the method according to any one of the first aspect or the possible designs of the first aspect.

According to another aspect, an embodiment of the present disclosure provides a computer program product including instructions. When the instructions are executed by a computer, the instructions enable the computer to perform the method according to any one of the first aspect or the possible designs of the first aspect.

DESCRIPTION OF EMBODIMENTS

According to an IPC method provided in an embodiment of the present disclosure, there is no need to reallocate a memory address in a second process to store data of a first process, therefore, there is no need to release memory after IPC is completed, thereby resolving a delay issue caused by memory copy, allocation, and release.

An embodiment of the present disclosure further provides a terminal, and the terminal may include at least a memory, a transceiver, and a processor. The memory may be configured to store a software program, the processor performs various functions of the terminal by running the software program stored in the memory, and the transceiver may be configured to receive and transmit a notification message.

Figure 1:
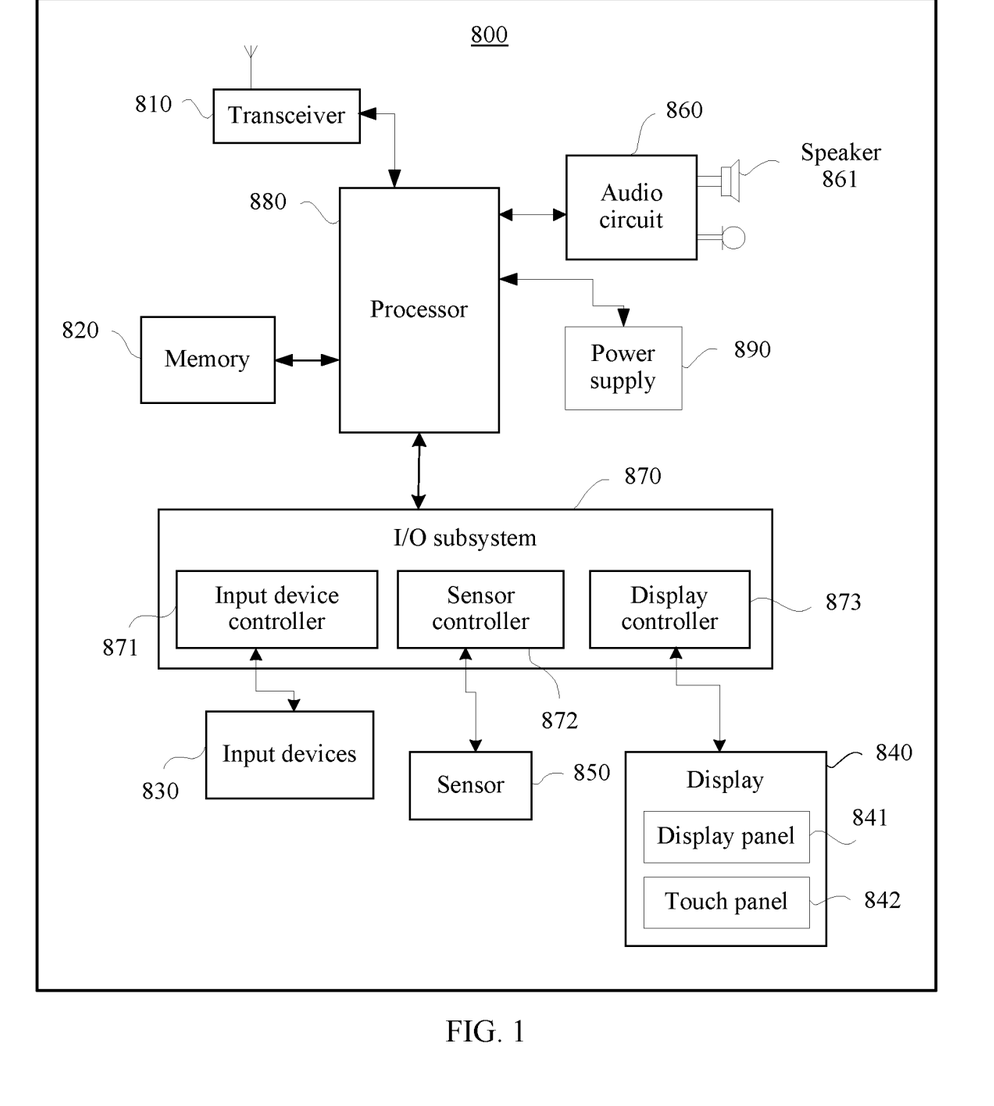
FIG. 1 is a schematic structural diagram of a mobile phone according to an embodiment of the present disclosure.

The following further describes a structure of the terminal using FIG. 1 as an example. FIG. 1 is a schematic structural diagram of a mobile phone according to an embodiment of the present disclosure. Referring to FIG. 1, the mobile phone 800 includes components such as a transceiver 810, a memory 820, input devices 830, a touchscreen 840, a sensor 850, an audio circuit 860, an I/O subsystem 870, a processor 880, and a power supply 890. A person skilled in the art may understand that a structure of the mobile phone shown in FIG. 1 imposes no limitation on the mobile phone, and the mobile phone may include more or fewer components than those shown in the figure or may have a different component arrangement, or some components may be combined, or some components may be split.

The following describes each constituent component of the mobile phone 800 in detail with reference to FIG. 1.

The transceiver 810 may be configured to receive and send a signal in an information receiving/transmitting process or a call process, and in particular, after receiving downlink information from a base station, send the downlink information to the processor 880 for processing, and in addition, send related uplink data to the base station. Usually, the transceiver 810 includes but is not limited to an antenna, at least one amplifier, a transceiver, a coupler, a low-noise amplifier (LNA), a duplexer, and the like. In addition, the transceiver 810 may further communicate with a network and another device through wireless communication. The wireless communication may use any communications standard or protocol, including but not limited to Global System for Mobile Communications (GSM), General Packet Radio Service (GPRS), code-division multiple access (CDMA), wideband CDMA (WCDMA), Long-Term Evolution (LTE), an email, short message service (SMS), and the like.

The memory 820 may be configured to store a software program, and the processor 880 performs various functions of the mobile phone 800 by executing the software program stored in the memory 820. The memory 820 may mainly include a program storage area and a data storage area. The program storage area may store an operating system, an application program required by at least one function (such as a sound playing function or an image playing function), and the like, and the data storage area may store data (such as audio data or an address book) maintained based on use of the mobile phone 800, and the like. In addition, the memory 820 may include a high-speed random-access memory (RAM), and may further include a nonvolatile memory, such as at least one magnetic disk storage device, a flash device, or another non-volatile solid-state storage device.

The input devices 830 may be configured to receive input number or character information, and generate key signal input related to a user setting and function control of the mobile phone 800. Further, the input devices 830 may include but are not limited to one or more of a physical keyboard, a function key (such as a volume control key or an on/off key), a trackball, a mouse, a joystick, an optical mouse (where the optical mouse is a touch-sensitive surface that does not display visual output, or an extension of a touch-sensitive surface formed by a touchscreen), and the like. The input devices 830 are connected to input device controller 871 of the I/O subsystem 870, and exchange a signal with the processor 880 under control of the input device controller 871.

The touchscreen 840 may be configured to display information entered by a user or information provided to a user, and various menus of the mobile phone 800, and may further receive user input. Further, the touchscreen 840 may include a display panel 841 and a touch panel 842. The display panel 841 may be configured in a form of a liquid-crystal display (LCD), an organic light-emitting diode (OLED), or the like. The touch panel 842, also referred to as a display, a touch-sensitive screen, or the like, can collect a contact or non-contact operation (for example, an operation performed by the user on the touch panel 842 or near the touch panel 842 using any proper object or accessory such as a finger or a stylus, or a motion sensing operation, where the operation includes an operation type such as a single-point control operation or a multipoint control operation) performed by the user on or near the touch panel 842, and drive a corresponding connection apparatus based on a preset program. Optionally, the touch panel 842 may include two parts a touch detection apparatus and a touch controller. The touch detection apparatus detects a gesture of the user, namely, a touch orientation or gesture, detects a signal brought by the touch operation, and transmits the signal to the touch controller. The touch controller receives touch information from the touch detection apparatus, converts the touch information into information that can be processed by the processor, and then sends the information to the processor 880. The touch controller can receive and execute a command sent by the processor 880. In addition, the touch panel 842 may be implemented in a plurality of form, such as a resistive form, a capacitive form, an infrared ray, and a surface acoustic wave, or the touch panel 842 may be implemented using any technology developed in the future. Further, the touch panel 842 may cover the display panel 841, and the user may perform, based on content displayed on the display panel 841 (the displayed content includes but is not limited to a soft keyboard, a virtual mouse, a virtual key, an icon, or the like), an operation on or near the touch panel 842 that covers the display panel 841. After detecting the operation on or near the touch panel 842, the touch panel 842 transmits the operation to the processor 880 using the I/O subsystem 870 to determine the user input. Then, the processor 880 provides corresponding visual output on the display panel 841 using the I/O subsystem 870 based on the user input. Although in FIG. 1, the touch panel 842 and the display panel 841 implement input and output functions of the mobile phone 800 as two independent components, in some embodiments, the touch panel 842 and the display panel 841 may be integrated to implement the input and output functions of the mobile phone 800.

The mobile phone 800 may further include at least one sensor 850, such as a light sensor, a motion sensor, and another sensor. Further, the light sensor may include an ambient light sensor and a proximity sensor. The ambient light sensor may adjust luminance of the display panel 841 based on brightness of ambient light, and the proximity sensor may disable the display panel 841 and/or backlight when the mobile phone 800 approaches an ear. As a motion sensor, an accelerometer sensor can detect a value of acceleration in each direction (usually, three axes), can detect a value and a direction of gravity in a static state, and can be used in an application for identifying a mobile phone posture (such as switching between a landscape orientation and a portrait orientation, a related game, and magnetometer posture calibration), a function related to vibration identification (such as a pedometer and a strike), and the like. Other sensors such as a gyroscope, a barometer, a hygrometer, a thermometer, and an infrared sensor may also be disposed in the mobile phone 800. Details are not described herein.

The audio circuit 860, a speaker 861, and a microphone 862 may provide an audio interface between the user and the mobile phone 800. The audio circuit 860 may convert received audio data into a signal and transmit the signal to the speaker 861, and the speaker 861 converts the signal into a sound signal for output. In addition, the microphone 862 converts a collected sound signal into a signal, and the audio circuit 860 receives the signal and converts the signal into audio data, and outputs the audio data to the transceiver 810 to send the audio data to, for example, another mobile phone, or outputs the audio data to the memory 820 for further processing.

The I/O subsystem 870 is configured to control an external input/output device, and may include the input device controller 871, a sensor controller 872, and a display controller 873. Optionally, one or more input device controllers 871 receive a signal from the input devices 830 and/or send a signal to the input devices 830. The input devices 830 may include a physical button (a press button, a rocker button, or the like), a dial pad, a slider switch, a joystick, a click scroll wheel, and an optical mouse (the optical mouse is a touch-sensitive surface that does not display visual output, or an extension of a touch-sensitive surface formed by a touchscreen). It should be noted that the input device controller 871 may be connected to any one or more of the foregoing devices. The display controller 873 in the I/O subsystem 870 receives a signal from the touchscreen 840 and/or sends a signal to the touchscreen 840. After the touchscreen 840 detects the user input, the display controller 873 converts the detected user input into interaction with a user interface object displayed on the touchscreen 840, to implement man-machine interaction. The sensor controller 872 may receive a signal from the one or more sensors 850 and/or send a signal to the one or more sensors 850.

The processor 880 is a control center of the mobile phone 800. The processor 880 connects parts of the whole mobile phone using various interfaces and lines, and performs various functions of the mobile phone 800 and processes data by running or executing the software program and/or a module that are/is stored in the memory 820 and by invoking data stored in the memory 820, thereby performing overall monitoring on the mobile phone. Optionally, the processor 880 may include one or more processing units. The processor 880 may integrate an application processor and a modem processor. The application processor mainly processes an operating system, a user interface, an application program, and the like. The modem processor mainly processes wireless communication. It can be understood that, alternatively, the modem processor may not be integrated into the processor 880.

The mobile phone 800 further includes the power supply 890 (such as a battery) that supplies power to each component. Preferably, the power supply may be logically connected to the processor 880 using a power management system, to manage functions such as charging, discharging, and power consumption using the power management system.

Although not shown, the mobile phone 800 may further include a camera, a Bluetooth module, and the like. Details are not described herein.

Operation processes of the components are as follows.

The processor 880 performs initialization configuration on a first process and a second process, where the initialization configuration includes creating first memory space in shared memory space, selects a communication manner based on a length of communication data of the first process and a value of a threshold, where the communication data includes data and a message, and the threshold is a size of the first memory space, and performs interprocess data exchange in the selected communication manner.

Optionally, the processor 880 selects, in response to a fact that the length of the communication data is less than the threshold, a memory sharing manner for communication, where in the memory sharing manner, the communication data is transmitted using the first memory space.

Optionally, the processor 880 allocates virtual address space to the second process, and maps a physical memory page in the first memory space to the virtual address space of the second process.

Optionally, the transceiver 810 sends the message to the second process, to trigger the second process to run.

Optionally, the processor 880 unmaps the physical memory page in the first memory space from the virtual address space, to release the virtual address space.

Optionally, the processor 880 selects, in response to a fact that the length of the communication data is greater than or equal to the threshold, a data file manner for communication, where in the data file manner, the communication data is stored as a data file, and metadata of the data file is transmitted using the first memory space.

Optionally, the processor 880 stores the communication data in second memory space outside the shared memory space, maps the second memory space to the data file, and stores the metadata of the data file in the first memory space.

Optionally, the processor 880 determines a to-be-used data file based on a first cache list that is used to store to-be-used file information, determines, based on the to-be-used data file, to-be-used shared memory corresponding to the to-be-used data file, determines whether the to-be-used shared memory includes to-be-used shared memory that meets the length of the communication data, and in response to a fact that the to-be-used shared memory includes to-be-used shared memory that meets the length of the communication data, uses, as the second memory space, the to-be-used shared memory that meets the length of the communication data, or in response to a fact that the to-be-used shared memory does not include to-be-used shared memory that meets the length of the communication data, creates, outside the shared memory space, shared memory that is used as the second memory space and that meets the length of the communication data.

Optionally, the processor 880 traverses a second cache list, where the second cache list is used to store file information of a data file in communication, determines, based on the communication status identifier, whether the second cache list includes file information corresponding to a data file for which communication has been completed, and in response to a fact that the second cache list includes the file information corresponding to the data file for which communication has been completed, stores, in the first cache list, the file information that is in the second cache list and that is corresponding to the data file for which communication has been completed, where the file information is used as to-be-used file information.

Optionally, the processor 880 successively performs determining starting from smallest to-be-used shared memory in the first cache list.

Optionally, the processor 880 determines whether the first memory space is sufficient to store the metadata of the data file, and in response to a fact that the first memory space is insufficient to store the metadata of the data file, expands the first memory space to be sufficient to store the metadata of the data file, or in response to a fact that the first memory space is sufficient to store the metadata of the data file, replaces original data in the first memory space with the metadata of the data file.

Optionally, the processor 880 exchanges data by transmitting the metadata of the data file.

Optionally, the processor 880 adjusts an address of the communication data.

Optionally, the transceiver 810 sends the message to the second process, where the message is used to trigger the second process, and the message includes the metadata of the data file.

Optionally, the processor 880 determines the corresponding second process based on control information corresponding to the file descriptor, and converts the file descriptor into a file descriptor that can be identified by the second process.

Optionally, the processor 880 triggers the second process to restore data in the data file based on the file descriptor that can be identified by the second process and the corresponding control information.

Optionally, the processor 880 determines a communication status of the data file based on the communication status identifier of the data file, and in response to a fact that communication has been completed for the data file, stores file information of the data file in the first cache list, where the file information is used as to-be-used file information for a next time.

Optionally, the processor 880 determines whether a volume of to-be-used file information stored in the first cache list is greater than a threshold of the first cache list, where the threshold of the first cache list is a maximum value of a volume of to-be-used file information that can be accommodated in the first cache list, and in response to a fact that the volume of to-be-used file information stored in the first cache list is greater than the threshold of the first cache list, determines, based on the to-be-used file information in the first cache list, a to-be-used data file corresponding to the to-be-used file information, determines, based on the to-be-used data file, to-be-used shared memory corresponding to the to-be-used data file, releases smallest to-be-used shared memory in the to-be-used shared memory, and deletes, from the first cache list, to-be-used file information corresponding to the smallest to-be-used shared memory.

Figure 2:
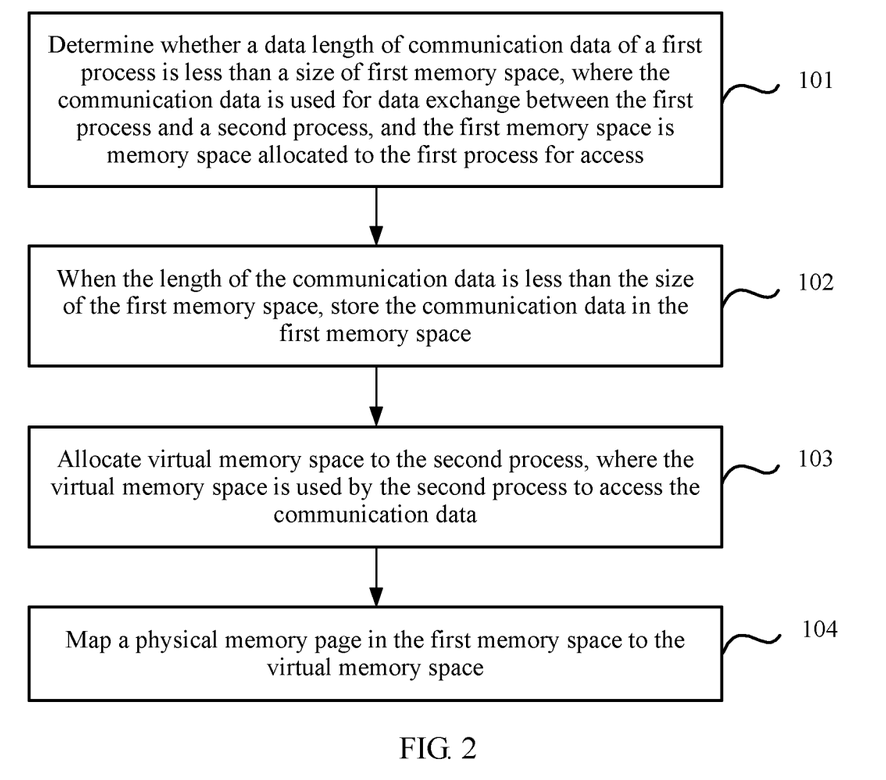
FIG. 2 is a flowchart of an IPC method according to an embodiment of the present disclosure.

FIG. 2 is a flowchart of an IPC method according to an embodiment of the present disclosure. The method includes the following steps.

Step 101: Determine whether a data length of communication data of a first process is less than a size of first memory space, where the communication data is used for data exchange between the first process and a second process, and the first memory space is memory space allocated to the first process for access.

Step 102: When the length of the communication data is less than the size of the first memory space, store the communication data in the first memory space.

Step 103: Allocate virtual memory space to the second process, where the virtual memory space is used by the second process to access the communication data.

Step 104: Map a physical memory page in the first memory space to the virtual memory space.

In a specific embodiment, in this method, in a memory sharing manner, a binder driver performs interprocess data exchange by remapping data, and in a data file manner, the binder driver performs interprocess data exchange by transmitting metadata of a data file, to implement IPC.

In an embodiment, when the length of the communication data is less than a threshold, a solution using a memory sharing mechanism is selected. In this solution, a read/write function is enabled using shared memory of the first process such that memory is fully shared between the first process and the second process. The following describes the solution in this embodiment with reference to accompanying drawings.

Figure 3:
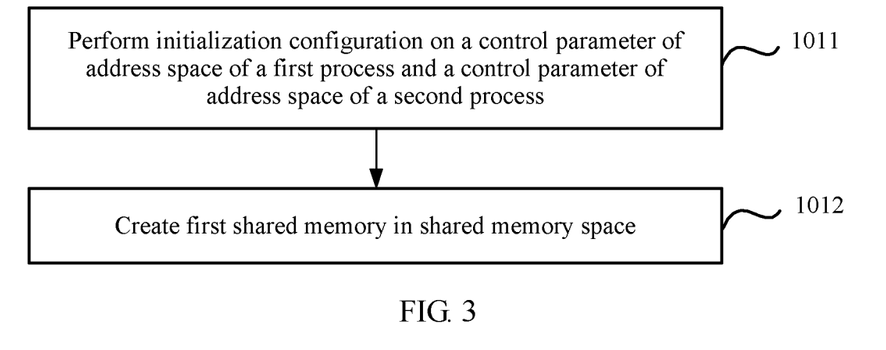
FIG. 3 is a flowchart in which initialization configuration is performed on a first process and a second process according to an embodiment of the present disclosure.

FIG. 3 is a schematic flowchart of a method for performing initialization configuration on a first process and a second process according to an embodiment of the present disclosure.

In an example, with reference to FIG. 1 and FIG. 2, correspondingly, in step 101, initialization configuration on the first process and the second process includes process initialization in user space and process initialization by a binder driver. Details are as follows.

Step 1011: Perform initialization configuration on a control parameter of address space of a first process and a control parameter of address space of a second process.

Step 1012: Create the first memory space in shared memory space.

In an example, correspondingly, in step 102, the length of the communication data and a value of the threshold are compared. A communication manner is selected based on a result of the comparison, and the threshold is the size of the first memory space allocated in step 101. When the length of the communication data is less than the threshold, the memory sharing manner is selected for communication. In the memory sharing manner, the communication data is transmitted using the first memory space.

In an example, correspondingly, in step 103, that interprocess data exchange is performed in the selected communication manner includes allocating virtual address space to the second process, and mapping the physical memory page in the first memory space to the virtual address space of the second process, thereby implementing zero data copy by remapping data in shared memory to the second process.

In an example, correspondingly, in step 103, a message is sent to the second process, to trigger the second process to run. In this way, the second process starts running, and directly reads data from the first memory space based on a remapped address, to exchange data with the first process.

After the interprocess data exchange is performed in the memory sharing manner, to reclaim a virtual address, the physical memory page in the first memory space is unmapped from the virtual address space, to release the virtual address space.

Figure 4:
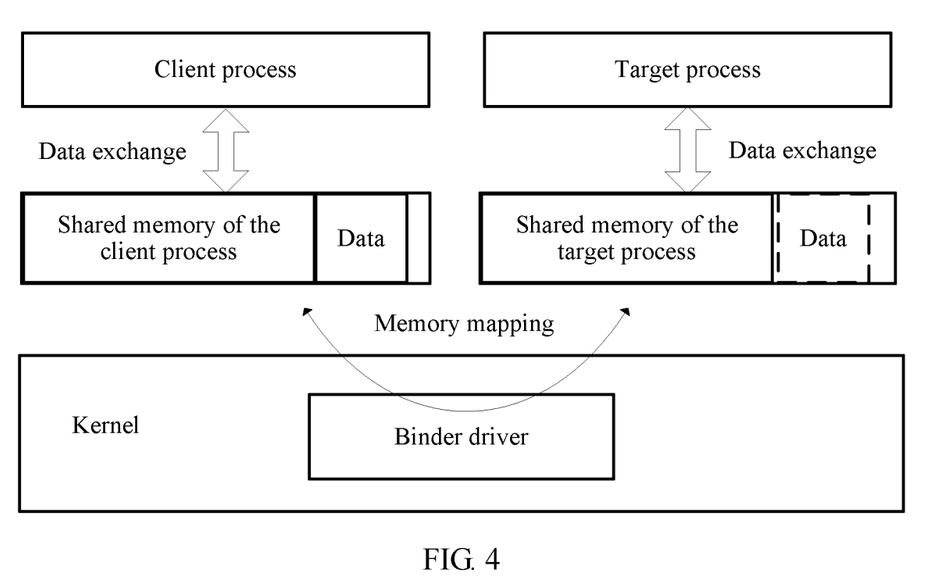
FIG. 4 is a schematic diagram of a memory sharing mechanism according to an embodiment of the present disclosure.

FIG. 4 is a schematic diagram of a memory sharing mechanism according to an embodiment of the present disclosure. It can be learned from FIG. 4 that, in a memory sharing solution, the first process writes data into the shared memory, and remaps the data in the shared memory to the second process by remapping the data such that the second process directly reads the data from the shared memory, thereby implementing zero data copy. Because there is no need to reallocate a memory address in the second process to store data of the first process, there is no need to release memory after IPC is completed, thereby resolving a delay issue caused by memory copy, allocation, and release.

In another embodiment, when the length of the communication data is greater than or equal to the threshold, a solution using a data file mechanism is selected. In this solution, to-be-transmitted data of the first process is stored using a data file, to bypass a restriction on the length of the communication data. The following describes the solution in this embodiment with reference to accompanying drawings.

In an example, first, in step 101, initialization configuration on the first process and the second process includes creating the first memory space in the shared memory space.

In an example, correspondingly, in step 102, that a communication manner is selected based on the length of the communication data and the value of the threshold includes selecting, in response to a fact that the length of the communication data reaches or exceeds the threshold, the data file manner for communication, where in the data file manner, the communication data is stored as a data file, and metadata of the data file is transmitted using the first memory space.

Figure 5:
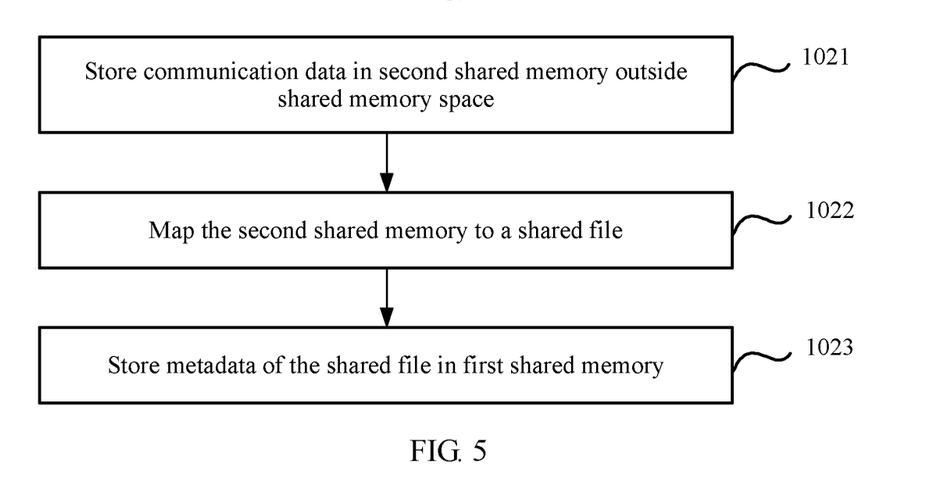
FIG. 5 is a schematic flowchart of a method for selecting a data file manner for communication according to an embodiment of the present disclosure.

FIG. 5 is a schematic flowchart of a method for selecting, in response to a fact that a length of communication data reaches or exceeds a threshold, a data file manner for communication according to an embodiment of the present disclosure. The schematic diagram shows substeps of step 102. With reference to FIG. 1 and FIG. 4, in step 102, the selecting, in response to a fact that the length of the communication data reaches or exceeds the threshold, the data file manner for communication further includes the following steps.

Step 1021: Store the communication data in second memory space outside shared memory space.

Step 1022: Map the second memory space to a data file.

Step 1023: Store metadata of the data file in the first memory space.

In an example, correspondingly, in step 1021, before the storing the communication data in second memory space outside shared memory space, the method further includes determining a to-be-used data file based on a first cache list that is used to store to-be-used file information, determining, based on the to-be-used data file, to-be-used shared memory corresponding to the to-be-used data file, and determining whether the to-be-used shared memory includes to-be-used shared memory that meets the length of the communication data, and in response to a fact that the to-be-used shared memory includes the to-be-used shared memory that meets the length of the communication data, using, as the second memory space, the to-be-used shared memory that meets the length of the communication data, or in response to a fact that the to-be-used shared memory does not include the to-be-used shared memory that meets the length of the communication data, creating, outside the shared memory space, shared memory that is used as the second memory space and that meets the length of the communication data.

The to-be-used file information includes a file descriptor, a file size, and a file start address.

Further, in an example, the data file includes a communication status identifier, the communication status identifier is used to indicate a communication status of the data file, and before the determining a to-be-used data file based on a first cache list that is used to store to-be-used file information, the method further includes traversing a second cache list, where the second cache list is used to store file information of a data file in communication, determining, based on the communication status identifier, whether the second cache list includes file information corresponding to a data file for which communication has been completed, and in response to a fact that the second cache list includes the file information corresponding to the data file for which communication has been completed, storing, in the first cache list, the file information that is in the second cache list and that is corresponding to the data file for which communication has been completed, where the file information is used as the to-be-used file information. In this way, it can be ensured that the data file, for which communication has been completed, corresponding to the file information that is in the second cache list and that has not been stored in the first cache list in time is also included in a selection range of a second cache, thereby improving cache resource utilization.

Further, in an example, file information in the first cache list is sorted based on a size of corresponding to-be-used shared memory, and the determining whether the to-be-used shared memory includes to-be-used shared memory that meets the length of the communication data includes successively performing determining starting from smallest to-be-used shared memory in the first cache list, and when the to-be-used shared memory includes the to-be-used shared memory that meets the length of the communication data, stopping determining and using the determined shared memory as the second memory space. In this way, smallest shared memory in shared memory that meets the length of the communication data and that is corresponding to a file descriptor in the first cache list is used with priority, to save space.

In an example, correspondingly, in step 1023, the storing metadata of the data file in the first memory space includes determining whether the first memory space is sufficient to store the metadata of the data file, and in response to a fact that the first memory space is insufficient to store the metadata of the data file, expanding the first memory space to be sufficient to store the metadata of the data file, or in response to a fact that the first memory space is sufficient to store the metadata of the data file, replacing original data in the first memory space with the metadata of the data file. In this way, the metadata of the data file is stored using the existing first memory space, thereby saving space.

Based on step 102, in an example, correspondingly, in step 103, that interprocess data exchange is performed in the selected communication manner includes exchanging data by transmitting the metadata of the data file.

Figure 6:
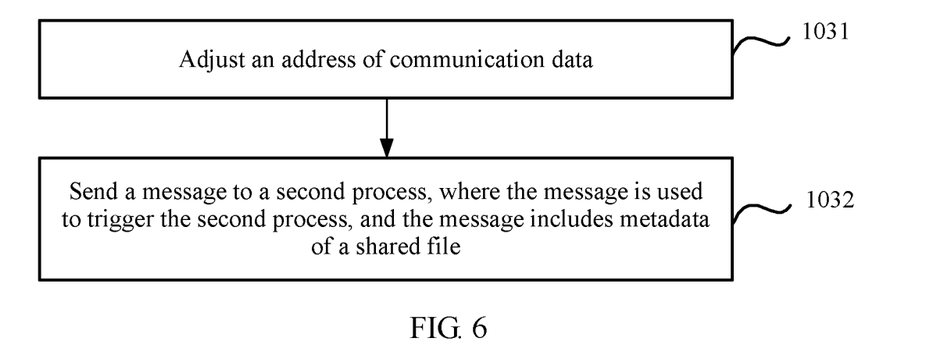
FIG. 6 is a schematic flowchart of an interprocess data exchange method according to an embodiment of the present disclosure.

FIG. 6 is a schematic flowchart of a method for selecting a data file manner for interprocess data exchange according to an embodiment of the present disclosure. The schematic diagram shows substeps of step 103. With reference to FIG. 1 and FIG. 5, correspondingly, in step 103, the exchanging data by transmitting the metadata of the data file includes the following steps.

Step 1031: Adjust an address of the communication data.

Step 1032: Send a message to the second process, where the message is used to trigger the second process, and the message includes metadata of a data file.

In an example, correspondingly, in step 1032, the metadata of the data file includes a file descriptor, and before the sending a message to the second process, the method further includes determining the corresponding second process based on control information corresponding to the file descriptor, and converting the file descriptor into a file descriptor that can be identified by the second process.

In an example, correspondingly, in step 1032, triggering the second process includes triggering the second process to restore data in the data file based on the file descriptor that can be identified by the second process and the corresponding control information.

Based on step 1032, in an example, after data exchange is completed in the data file manner, the method includes determining a communication status of the data file based on a communication status identifier of the data file, and in response to a fact that communication has been completed for the data file, storing, in a first cache list, file information of the data file for which communication is completed, where the file information is used as to-be-used file information for a next time. In this way, a file used at the end of reading by the second process is reserved and is used as a backup for a next process.

Further, in an example, the storing, in a first cache list, file information of the data file for which communication is completed, where the file information is used as to-be-used file information for a next time further includes determining whether a volume of to-be-used file information stored in the first cache list is greater than a threshold of the first cache list, where the threshold of the first cache list is a maximum value of a volume of to-be-used file information that can be accommodated in the first cache list, and in response to a fact that the volume of to-be-used file information stored in the first cache list is greater than the threshold of the first cache list, determining, based on the to-be-used file information in the first cache list, a to-be-used data file corresponding to the to-be-used file information, determining, based on the to-be-used data file, to-be-used shared memory corresponding to the to-be-used data file, releasing smallest to-be-used shared memory in the to-be-used shared memory, and deleting, from the first cache list, to-be-used file information corresponding to the smallest to-be-used shared memory. In this way, an upper limit of a stored volume of to-be-used file information is set in the first cache list. When the stored volume reaches the upper limit, the smallest memory is released. This ensures that memory is not occupied because there is excessive shared cache memory, and can also improve cache utilization.

Figure 7:
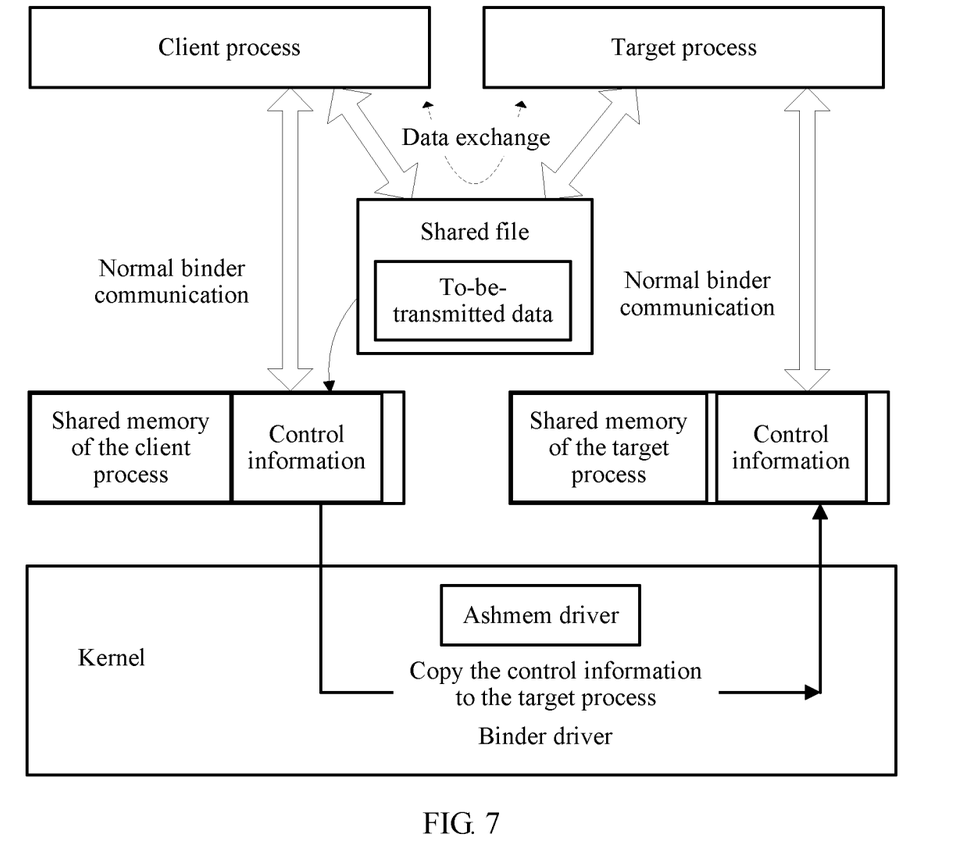
FIG. 7 is a schematic diagram of a data file mechanism according to an embodiment of the present disclosure.

FIG. 7 is a schematic diagram of a data file mechanism according to an embodiment of the present disclosure. It can be learned from FIG. 7 that in a data file solution, to-be-transmitted data of the first process is stored using a data file. In this process, a binder driver only needs to transmit metadata of the data file without a need to transmit the entire file, and data sharing can be implemented. In this manner, a restriction imposed by a binder communication mechanism on a volume of carried data can be bypassed.

Figure 8:
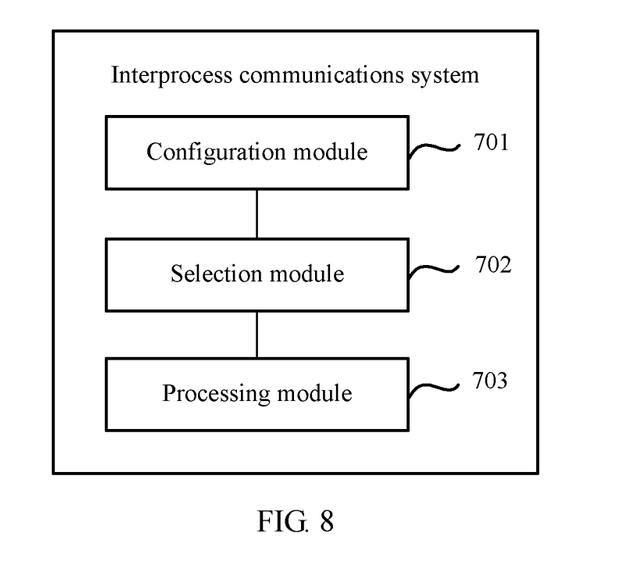
FIG. 8 is a schematic structural diagram of an interprocess communications system according to an embodiment of the present disclosure.

FIG. 8 is a schematic structural diagram of an interprocess communications system according to an embodiment of the present disclosure.

The interprocess communications system provided in this embodiment of the present disclosure includes a configuration module 701, a selection module 702, and a processing module 703. The configuration module 701 is configured to perform initialization configuration on a first process and a second process, where the initialization configuration includes creating first memory space in shared memory space. The selection module 702 selects a communication manner based on a length of communication data and a value of a threshold, where the threshold is a size of the first memory space. The processing module 703 is configured to perform interprocess data exchange in the selected communication manner. In a specific example, the shared memory space is usually set to 131072 Bytes (128 kiloB (KB)), and the size of the first memory space may be set to 8 KB.

Corresponding to the embodiment in which the solution using the memory sharing mechanism is selected when the length of the communication data is less than the threshold, that the configuration module 701 performs initialization configuration on a first process and a second process includes performing initialization configuration on a control parameter of address space of the first process and a control parameter of address space of the second process, and creating the first memory space in the shared memory space.

In an example, the selection module 702 selects the communication manner based on the length of the communication data and the value of the threshold, where the threshold is the size of the first memory space allocated in the shared memory space, and selects, in response to a fact that the length of the communication data is less than the threshold, a memory sharing manner for communication.

In an example, that the processing module 703 performs interprocess data exchange in the selected communication manner includes allocating virtual address space to the second process, and mapping a physical memory page in the first memory space to the virtual address space of the second process, thereby implementing zero data copy by remapping data in shared memory to the second process.

In an example, the processing module 703 sends a message to the second process, to trigger the second process to run. In this way, the second process starts running, and directly reads data from the first memory space based on a remapped address, to exchange data with the first process.

After performing the interprocess data exchange in the memory sharing manner, in order to reclaim a virtual address, the processing module 703 unmaps the physical memory page in the first memory space from the virtual address space, to release the virtual address space.

In a memory sharing solution, the first process writes data into the shared memory, and remaps the data in the shared memory to the second process by remapping the data such that the second process directly reads the data from the shared memory, thereby implementing zero data copy. Because there is no need to reallocate a memory address in the second process to store data of the first process, there is no need to release memory after IPC is completed, thereby resolving a delay issue caused by memory copy, allocation, and release.

Corresponding to the embodiment in which the data file mechanism is selected when the length of the communication data is greater than the threshold, to-be-transmitted data of the first process is stored using a data file, to bypass a restriction on the length of the communication data.

In an example, that the configuration module 701 performs initialization configuration on a first process and a second process further includes creating the first memory space in the shared memory space.

In an example, that the selection module selects a communication manner based on a length of communication data and a value of a threshold includes selecting, in response to a fact that the length of the communication data reaches or exceeds the threshold, a data file manner for communication.

In an example, that the selection module selects, in response to a fact that the length of the communication data reaches or exceeds the threshold, a data file manner for communication further includes storing the communication data in second memory space outside the shared memory space, mapping the second memory space to the data file, and storing metadata of the data file in the first memory space.

In an example, before storing the communication data in the second memory space outside the shared memory space, the selection module further includes determining a to-be-used data file based on a first cache list that is used to store to-be-used file information, determining, based on the to-be-used data file, to-be-used shared memory corresponding to the to-be-used data file, and determining whether the to-be-used shared memory includes to-be-used shared memory that meets the length of the communication data, and in response to a fact that the to-be-used shared memory includes the to-be-used shared memory that meets the length of the communication data, using, as the second memory space, the to-be-used shared memory that meets the length of the communication data, or in response to a fact that the to-be-used shared memory does not include the to-be-used shared memory that meets the length of the communication data, creating, outside the shared memory space, shared memory that is used as the second memory space and that meets the length of the communication data.

The to-be-used file information includes a file descriptor, a file size, and a file start address.

Further, in an example, the data file includes a communication status identifier, the communication status identifier is used to indicate a communication status of the data file, and before determining the to-be-used data file based on the first cache list that is used to store the to-be-used file information, the selection module further includes traversing a second cache list, where the second cache list is used to store file information of a data file in communication, determining, based on the communication status identifier, whether the second cache list includes file information corresponding to a data file for which communication has been completed, and in response to a fact that the second cache list includes the file information corresponding to the data file for which communication has been completed, storing, in the first cache list, the file information that is in the second cache list and that is corresponding to the data file for which communication has been completed, where the file information is used as the to-be-used file information. In this way, it can be ensured that the data file, for which communication has been completed, corresponding to the file information that is in the second cache list and that has not been stored in the first cache list in time is also included in a selection range of a second cache, thereby improving cache resource utilization.

Further, in an example, file information in the first cache list is sorted based on a size of corresponding to-be-used shared memory, and that the selection module determines whether the to-be-used shared memory includes to-be-used shared memory that meets the length of the communication data further includes successively performing determining starting from smallest to-be-used shared memory in the first cache list, and when the to-be-used shared memory includes the to-be-used shared memory that meets the length of the communication data, stopping determining and using the determined shared memory as the second memory space. In this way, smallest shared memory in shared memory that meets the length of the communication data and that is corresponding to a file descriptor in the first cache list is used with priority, to save space.

In an example, that the selection module stores metadata of the data file in the first memory space includes determining whether the first memory space is sufficient to store the metadata of the data file, and in response to a fact that the first memory space is insufficient to store the metadata of the data file, expanding the first memory space to be sufficient to store the metadata of the data file, or in response to a fact that the first memory space is sufficient to store the metadata of the data file, replacing original data in the first memory space with the metadata of the data file.

On a basis that the data file manner is selected for communication, in an example, that the processing module performs interprocess data exchange in the selected communication manner includes exchanging data by transmitting the metadata of the data file.

The exchanging data by transmitting the metadata of the data file further includes adjusting an address of the communication data, and sending a message to the second process, where the message is used to trigger the second process, and the message includes the metadata of the data file.

Further, in an example, the metadata of the data file includes a file descriptor, and before sending the message to the second process, the processing module 703 is further configured to perform determining the corresponding second process based on control information corresponding to the file descriptor, and converting the file descriptor into a file descriptor that can be identified by the second process.

Further, in an example, that the processing module triggers the second process includes triggering the second process to restore data in the data file based on the file descriptor that can be identified by the second process and the corresponding control information.

In an example, after completing data exchange in the data file manner, the processing module 703 determines a communication status of the data file based on a communication status identifier of the data file, and in response to a fact that communication has been completed for the data file, stores, in a first cache list, file information of the data file for which communication is completed, where the file information is used as to-be-used file information for a next time. In this way, a file used at the end of reading by the second process is reserved and is used as a backup for a next process.

Further, in an example, that the processing module stores, in the first cache list, file information of the data file for which communication is completed, where the file information is used as to-be-used file information for a next time further includes determining whether a volume of to-be-used file information stored in the first cache list is greater than a threshold of the first cache list, where the threshold of the first cache list is a maximum value of a volume of to-be-used file information that can be accommodated in the first cache list, and in response to a fact that the volume of to-be-used file information stored in the first cache list is greater than the threshold of the first cache list, determining, based on the to-be-used file information in the first cache list, a to-be-used data file corresponding to the to-be-used file information, determining, based on the to-be-used data file, to-be-used shared memory corresponding to the to-be-used data file, releasing smallest to-be-used shared memory in the to-be-used shared memory, and deleting, from the first cache list, to-be-used file information corresponding to the smallest to-be-used shared memory. In this way, an upper limit of a stored volume of to-be-used file information is set in the first cache list. When the stored volume reaches the upper limit, the smallest memory is released. This ensures that memory is not occupied because there is excessive shared cache memory, and can also improve cache utilization.

In an example, alternatively, the first process may send the metadata of the data file to the second process using a kernel. The first process sends the metadata of the data file to the kernel, and the kernel determines, using the metadata, a physical address of memory space in which the data file is located. After allocating a virtual memory address to the second process, the kernel maps a physical memory address of the data file to the virtual memory address of the second process such that the second process accesses the data file using the virtual memory address, to access the communication data.

In the data file solution, the to-be-transmitted data of the first process is stored using the data file. In this process, a binder driver only needs to transmit metadata of the data file without a need to transmit the entire file, and data sharing can be implemented. In this manner, a restriction imposed by a binder communication mechanism on a volume of carried data can be bypassed.

The following describes a specific implementation embodiment to facilitate understanding of this solution.

In an embodiment, an overall method procedure of binder communication is optimized. Specific steps are as follows.

Step 1: Perform initialization configuration on processes (a client process and a target process), including process initialization in user space and process initialization by a binder driver.

Step 2: Determine a length of communication data (including data and a message), and if the length is less than a threshold (where the threshold is usually set to 1040384 B (1 megabyte (MB)-8 kilobyte (KB)), perform communication in a "memory sharing manner", or if the length exceeds a threshold, perform communication in a "file sharing manner".

Step 3: The binder driver performs interprocess data exchange in a "data sharing manner" (by remapping data or by transmitting metadata of a shared file), to implement IPC.

During the communication in the "memory sharing manner", the binder driver remaps data in shared memory to the target process, to implement zero copy. Because there is no need to reallocate a memory address in the target process to store data of the client process, there is no need to release memory after IPC is completed, thereby resolving a delay caused by memory copy, allocation, and release.

Specific steps are as follows.

Step 1: Perform initialization configuration on processes (a client process and a target process), including process initialization in user space and process initialization by a binder driver.

1. A control parameter is initialized in the user space.
2. Shared memory is actually allocated in kernel space (that is, read/write memory space of 1 MB-8 KB is created), and the shared memory is mapped to a memory address.
3. Each thread is initialized, a thread identifier (ID) is allocated, and a shared memory area is determined.

Step 2: Determine a length of communication data (including data and a message), and if the length is less than a threshold (the threshold is usually set to 1040384 B (1 MB-8 KB)), perform communication in a "memory sharing manner".

1. When the length of the communication data (including the data and the message) is less than a length of shared memory of each thread, communication is performed in the memory sharing manner, otherwise, an original procedure is followed.
2. Only a thread added to a worker thread pool uses the shared memory for communication.
3. The shared memory is used for communication only for a synchronization message.
4. The shared memory is used for communication only for a message sent to a kernel binder driver.

5. The kernel binder driver needs to be instructed, using an input/output control (ioctl) message, to pre-allocate shared memory of a size required for communication such that the shared memory can be used.

Step 3: The binder driver performs interprocess data exchange in a "data sharing manner" (by remapping data), to implement IPC.

1. After the ioctl message is received from the user space, whether a received memory address is in the shared memory area needs to be determined, and if yes, processing is performed in the memory sharing manner, otherwise, the original procedure is followed.
2. There is no need to allocate memory to store communication data content of the client process, and the communication data content only needs to be remapped to address space of the target process.
3. A memory notification message is pooled.

During communication in the "memory sharing manner", to-be-transmitted data of the client process is stored using an additional shared file. In this way, the binder driver only needs to transmit metadata of the shared file to implement data sharing. In the file sharing manner, a restriction imposed by a binder communication mechanism in ANDROID on a volume of carried data is bypassed.

Specific steps are as follows.

Step 1: Perform initialization configuration (which is the same as initialization configuration in a binder communication manner in other approaches) on processes (a client process and a target process) allocate a memory address of 1 MB-8 KB separately to the client process and the target process and map the memory address to shared memory (a size of the memory is a maximum bearable data length during binder communication), and serializing data of the client process.

Step 2: Determine a length of communication data (including data and a message), and if the length exceeds a threshold (where the threshold is usually set to 1040384 B (1 MB-8 KB)), perform communication in a "file sharing manner", to be specific, expand Parcel memory, where a binder driver only needs to transmit metadata of the shared file, to implement data sharing.

1. Whether to use file sharing is determined based on the length of the communication data, and if the length of the data exceeds a threshold, a shared memory area is created using ashmem, to implement sharing, otherwise, an original procedure is used for communication.
2. If the shared memory has been used, but shared memory space is insufficient, the shared memory area needs to be remapped.

Step 3: The binder driver performs interprocess data exchange in a "data sharing manner" (by transmitting the metadata of the shared file), to implement IPC.

1. The shared file is not used for communication in asynchronous communication. Therefore, before data is delivered to the driver, if the data is already in the shared memory, an original mode needs to be returned to.
2. Whether the shared file is used for processing is determined using a shared file flag, and if the shared file is used, backed-up metadata of the shared file needs to be sent to the driver, where data of the shared file remains unchanged.
3. After a command is received from the binder driver, whether the shared file is used for communication needs to be checked, and if yes, the data in the shared file needs to be restored to a communication packet, and the communication packet is transmitted to a service process for processing, otherwise, an original procedure is followed.

4. If the shared file has been used, the shared memory area needs to be unmapped, a file handle is disabled, and a file descriptor object is released, otherwise, an original procedure is returned to.

It should be noted that the module division in this embodiment of the present disclosure is an example, and is merely logical function division. There may be another division manner during actual implementation.

It may be understood that to implement the foregoing functions, the IPC system includes a corresponding hardware structure and/or software module for performing the functions. A person of ordinary skill in the art should easily be aware that the units and algorithm steps in the examples described in combination with the embodiments disclosed in this specification may be implemented by hardware or a combination of hardware and computer software in the present disclosure. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

A person skilled in the art should be aware that in the foregoing one or more examples, functions described in the present disclosure may be implemented by hardware, software, firmware, or any combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of the present disclosure are further described in detail in the foregoing specific embodiments. It should be understood that the foregoing descriptions are merely specific embodiments of the present disclosure, but are not intended to limit the protection scope of the present disclosure. Any modification, equivalent replacement, or improvement made on a basis of the technical solutions of the present disclosure shall fall within the protection scope of the present disclosure.

What is claimed is:

1. An interprocess communication method, comprising:
   making a first determination that a data length of communication data of a first process is less than a size of a first memory space, wherein the communication data is for data exchange between the first process and a second process;
   allocating the first memory space to the first process for access;
   storing, in response to the first determination, communication data of the first process in the first memory space;
   allocating a virtual memory space to the second process to enable the second process to access the communication data;
   mapping a physical memory page in the first memory space to the virtual memory space; and
   storing, in response to a second determination, the communication data as a data file, wherein the second process accesses the communication data using metadata of the data file in response to the data length of the communication data being greater than the size of the first memory space.

2. The interprocess communication method of claim 1, further comprising demapping the physical memory page from a virtual address space to release the virtual address space.

3. The interprocess communication method of claim 1, wherein in response to the data length of the communication data is greater than the size of the first memory space, the interprocess communication method further comprises:
   storing the communication data in a second memory space outside the first memory space;
   mapping the second memory space to the data file; and
   storing the metadata of the data file in the first memory space.

4. The interprocess communication method of claim 1, wherein in response to the data length of the communication data is greater than the size of the first memory space, the interprocess communication method further comprises sending a message to the second process, wherein the message comprises the metadata of the data file.

5. The interprocess communication method of claim 4, wherein the metadata of the data file comprises a first file descriptor, and wherein before sending the message to the second process, the interprocess communication method further comprises:
   determining a corresponding second process based on control information corresponding to the first file descriptor; and
   converting the first file descriptor into a second file descriptor that is capable of being identified by the second process.

6. The interprocess communication method of claim 5, further comprising:
   performing interprocess data exchange in a selected communication manner;
   determining a communication status of the data file based on a communication status identifier of the data file; and
   storing, in response to the determination that communication status is completed for the data file, file information of the data file in a first cache list.

7. The interprocess communication method of claim 1, wherein in response to the data length of the communication data is greater than the size of the first memory space, the interprocess communication method further comprises:
   storing the communication data in a second memory space outside the first memory space;
   sending the metadata of the data file to a kernel;
   allocating the virtual memory space to the second process to enable the second process to access the communication data; and
   mapping a physical memory address space of the data file to the virtual memory space based on the metadata.

8. A computer system, comprising:
   a memory configured to store instructions; and
   a processor coupled to the memory, wherein the instructions cause the processor to be configured to:
      make a first determination that a data length of communication data of a first process is less than a size of a first memory space, wherein the communication data is for data exchange between the first process and a second process;
      allocate the first memory space to the first process for access;

store, in response to the first determination, communication data of the first process in the first memory space;

allocate a virtual memory space to the second process to enable the second process to access the communication data;

map a physical memory page in the first memory space to the virtual memory space; and store, in response to a second determination, the communication data as a data file, wherein the second process accesses the communication data using metadata of the data file when the data length of the communication data is greater than the size of the first memory space.

9. The computer system of claim 8, wherein the instructions further cause the processor to be configured to demap the physical memory page from a virtual address space to release the virtual address space.

10. The computer system of claim 8, wherein when the data length of the communication data is greater than the size of the first memory space, the instructions further cause the processor to be configured to:

store the communication data in a second memory space outside the first memory space;

map the second memory space to the data file; and store the metadata of the data file in the first memory space.

11. The computer system of claim 8, wherein when the data length of the communication data is greater than the size of the first memory space, the instructions further cause the processor to be configured to send a message to the second process, wherein the message comprises the metadata of the data file.

12. The computer system of claim 11, wherein before sending the message to the second process, the instructions further cause the processor to be configured to:

determine a corresponding second process based on control information corresponding to a first file descriptor comprising in the metadata of the data file; and convert the first file descriptor into a second file descriptor that is capable of being identified by the second process.

13. The computer system of claim 12, wherein the instructions further cause the processor to be configured to:

make a third determination that a communication status of the data file based on a communication status identifier of the data file; and store, in response to the third determination that communication status is completed for the data file, file information of the data file in a first cache list.

14. The computer system of claim 8, wherein when the data length of the communication data is greater than the size of the first memory space, the instructions further cause the processor to be configured to:

store the communication data in a second memory space outside the first memory space;

send the metadata of the data file to a kernel;

allocate the virtual memory space to the second process to enable the second process to access the communication data; and map a physical memory address space of the data file to the virtual memory space based on the metadata.

15. A computer program product comprising computer-executable instructions for storage on a non-transitory computer readable storage medium that, when executed by a processor, cause a computer to:

make a first determination that a data length of communication data of a first process is less than a size of a first memory space, wherein the communication data is for data exchange between the first process and a second process;

allocate the first memory space to the first process for access;

store, in response to the first determination, communication data of the first process in the first memory space;

allocate a virtual memory space to the second process to enable the second process to access the communication data;

map a physical memory page in the first memory space to the virtual memory space; and store, in response to a second determination, the communication data as a data file wherein the second process accesses the communication data using metadata of the data file when the data length of the communication data is greater than the size of the first memory space.

16. The computer program product of claim 15, wherein when the data length of the communication data is greater than the size of the first memory space, the instructions, when executed by the processor, cause the computer to:

store the communication data in a second memory space outside the first memory space;

map the second memory space to the data file; and store the metadata of the data file in the first memory space.

17. The computer program product of claim 15, wherein when the data length of the communication data is greater than the size of the first memory space the instructions, when executed by the processor, cause the computer to send a message to the second process, wherein the message comprises the metadata of the data file.

18. The computer program product of claim 17, wherein before sending the message to the second process, the instructions, when executed by the processor, cause the computer to:

determine a corresponding second process based on control information corresponding to a first file descriptor comprising in the metadata of the data file; and convert the first file descriptor into a second file descriptor that is capable of being identified by the second process.

19. The computer program product of claim 18, wherein the instructions, when executed by the processor, cause the computer to:

make a third determination that a communication status of the data file based on a communication status identifier of the data file; and store, in response to the third determination that communication status is completed for the data file, file information of the data file in a first cache list.

20. The computer program product of claim 15, wherein when the data length of the communication data is greater than the size of the first memory space, the instructions, when executed by the processor, cause the computer to:

store the communication data in a second memory space outside the first memory space;

send the metadata of the data file to a kernel;

allocate the virtual memory space to the second process to enable the second process to access the communication data; and map a physical memory address space of the data file to the virtual memory space based on the metadata.

* * * * *

UNITED STATES PATENT AND TRADEMARK OFFICE
CERTIFICATE OF CORRECTION

PATENT NO. : 11,892,953 B2
APPLICATION NO. : 16/846764
DATED : February 6, 2024
INVENTOR(S) : Qibin Yang, Senyu Liu and Xiaohui Bie

Page 1 of 1

It is certified that error appears in the above-identified patent and that said Letters Patent is hereby corrected as shown below:

In the Claims

Claim 15, Column 24, Line 16: "data file wherein the" should read "data file, wherein the"

Signed and Sealed this
Twenty-third Day of July, 2024

Katherine Kelly Vidal
*Director of the United States Patent and Trademark Office*